June 6, 1939.  J. L. ANDERSON  2,161,121

CUTTING OR WELDING MACHINE

Filed Feb. 10, 1938  2 Sheets-Sheet 1

INVENTOR
James L. Anderson
BY
J. F. Brandenburg
ATTORNEY

June 6, 1939.  J. L. ANDERSON  2,161,121
CUTTING OR WELDING MACHINE
Filed Feb. 10, 1938  2 Sheets-Sheet 2
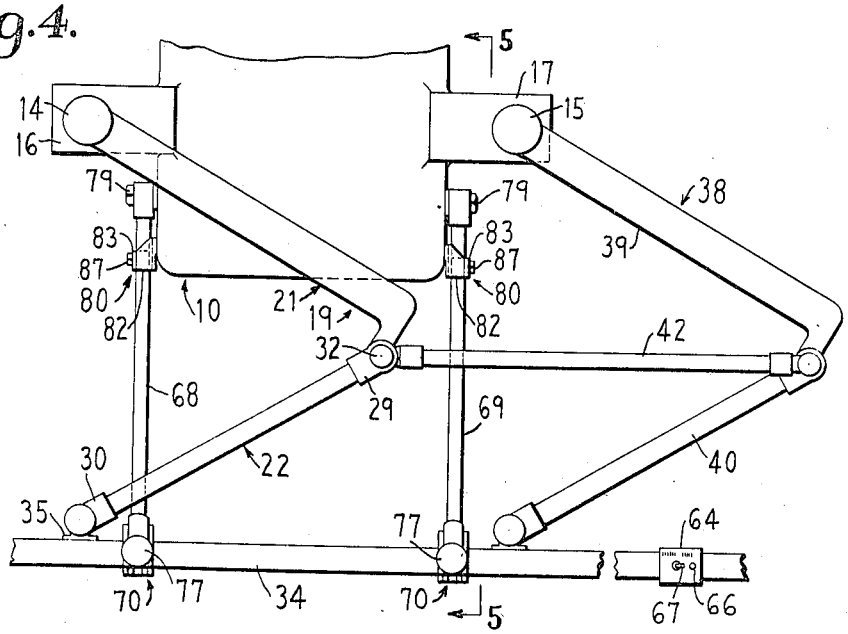

Patented June 6, 1939

2,161,121

UNITED STATES PATENT OFFICE 2,161,121

CUTTING OR WELDING MACHINE

James L. Anderson, Closter, N. J., assignor to Air Reduction Company, Incorporated, New York, N. Y., a corporation of New York Application February 10, 1938, Serial No. 189,815

16 Claims. (Cl. 266—23)

This invention relates to machines for moving a torch along a desired course during a cutting or welding operation.

In accordance with one feature of the invention the same machine will move the torch in any and changing directions in a plane along a path determined by a tracing device, or along a straight line with or without tracer guidance. It may be said, therefore, that one object of the invention is to provide a cutting or welding machine that can be used interchangeably as a universal torch machine, or straight-line cutter without pattern guidance.

Another feature of the invention relates to improved means for controlling the speed of movement of the carriage from which the torch is supported. A machine embodying this feature is equipped with an electric motor, a governor for controlling the motor speed, and remote control means for effecting adjustment of the governor, the control means being preferably power operated. The preferred embodiment of the invention has a small motor connected with the governor adjustment device, and remote control means for starting and stopping the motor and for reversing its direction of movement.

One advantage of a remote control of the governor adjustment is that the control station can be moved to different parts of the frame of the machine to obtain the most convenient location for the attendant. A tachometer located within view of the control station enables the attendant to adjust the motor speed to the desired value without relying on guesswork.

Other objects, features and advantages of the invention will appear or be pointed out as the specification proceeds.

In the accompanying drawings, forming part hereof:

Fig. 4 is a fragmentary top plan view showing the braces between the carriage body and front bar of the machine shown in Fig. 1.

Fig. 5 is an enlarged, sectional view taken on the line 5—5 of Fig. 4.

Fig. 6 is an enlarged sectional view taken on the line 6—6 of Fig. 5.

Figure 1:
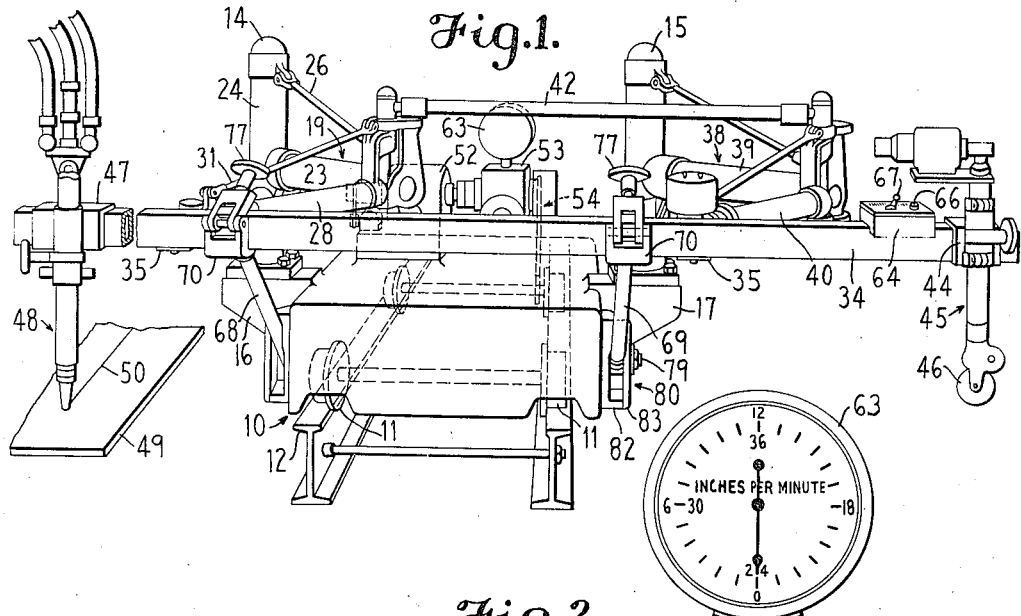
Fig. 1 is a perspective view of a cutting machine embodying the invention.

The embodiment of the invention shown in the drawings includes a truck or carriage 10 with flanged wheels 11 that run on a track 12. Posts 14 and 15 are supported by brackets 16 and 17 at opposite sides of the carriage body.

A jointed arm 19 extends outward from the post 14. This arm, best shown in Fig. 5, has a rearward link 21 and a forward link 22. The rearward link includes a tubular member 23 connected at one end with a bearing sleeve 24 that fits the post 14 and connected at the other end to an end casting 25. This composite construction is strengthened by a brace 26 connected with the bearing sleeve 24 and end casting 25 and running at an angle to the tubular member 23.

The forward link 22 includes a tubular portion 28 with end castings 29 and 30 connected to its rearward and forward ends, respectively, and a diagonal brace 31 extending between the end castings. A pin 32 connects the adjacent end castings of the rearward and forward links to form the joint of the arm 19.

A front bar 34 has a bracket 35 which is joined to the end casting 30 of the jointed arm 19 by a pivot connection.

Referring back to Fig. 1, a jointed arm 38 is swung from the post 15 and comprises rearward and forward links 39 and 40, respectively. The construction of this jointed arm 38 is similar to that of the arm 19 already described.

The jointed arms 19 and 38 are held parallel to each other at all times by a link 42 connected between the joints of the respective arms, and by the front bar 34 that connects with both links through pivot connections having the same spacing as the posts 14 and 15. The front bar 34, connecting link 42, and forward links 22 and 40 form a folding parallelogram frame, and the front bar 34 is capable of universal movement in a plane, but it moves parallel to itself so that it always remains at right angles to the direction in which the track 12 extends.

The front bar 34 extends at both ends beyond its connections with the jointed arms 19 and 38. A tracer-holder 44 is secured to the front bar 34, near one end, and supports a manually-guided tracing device 45 that has a traction wheel 46. A torch-holder 47 clamped on the other end of the front bar supports a torch 48 over a work-piece 49. The drawings show the torch 48 making a cut 50, but the machine can be used for welding by replacing the cutting torch with a welding torch.

When used for cutting in accordance with the outline of a drawing, the tracing device 45 is lowered to bring its traction wheel 46 into contact with the drawing and then guided to cause it to follow the outline on the drawing. Since all points on the front bar 34 have the same movement, the torch 48 follows a path identical with that followed by the tracer wheel.

In order to increase the size of the field over which the torch and tracer can operate, mechanism is provided for moving the carriage 10 intermittently during a cutting or welding operation. When the front bar 34 moves forward until the jointed arms are almost fully extended, driving mechanism on the carriage body causes the carriage to move toward the front bar at a speed fast enough to cause the jointed arms to fold part-way so that the front bar can continue to move forward.

When the front bar moves rearwardly until the jointed arms are almost completely folded, the carriage-moving mechanism operates to move the carriage rearwardly and extend the arms. The work area and tracing area over which the torch and tracer travel can be made of indefinite length by extending the track 12.

Automatic mechanism for causing the carriage to move along the track as often as the front bar 34 moves the jointed arms close to their limits of travel is shown in my Patent 2,032,733, dated March 3, 1936, but an explanation of that mechanism is not necessary for a complete understanding of this invention. For the purposes of this case it is sufficient to understand that the carriage 10 has wheels and a motor for driving it along the track whenever the front bar approaches its limit of travel during tracer-controlled cutting.

Figure 2:
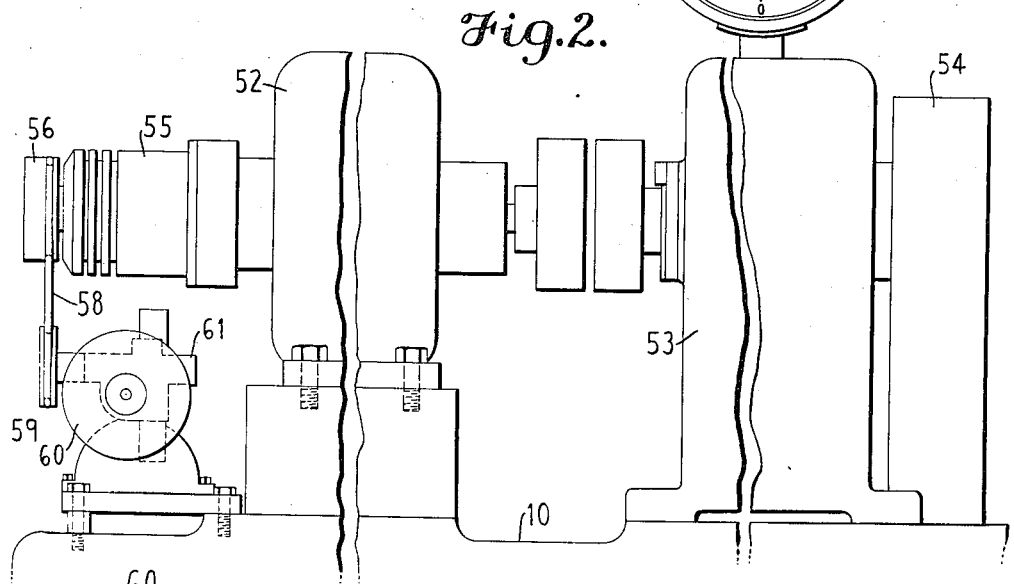
Fig. 2 is an enlarged detail view of a portion of the structure shown in Fig. 1.

The carriage 10 is propelled in either direction along the track 12 by a reversible electric motor 52 that drives the traction wheels of the carriage through a speed-reducing unit 53 and chain and sprocket mechanism 54 which transmits motion from the low-speed end of the speed-reducing unit 53 to an axle of the carriage. The centrifugal governor 55 (Fig. 2) on one end of the motor 52 is connected in the motor circuit and becomes effective to prevent any further increase when the motor speed reaches a certain value, which is dependent upon the position of the governor-adjusting knob 56. Turning the knob 56 in one direction raises the speed at which the governor becomes effective, whereas rotation of the knob in the opposite direction makes the governor effective at a lower motor speed. Centrifugal governors of this kind are widely used and well understood in the cutting and welding art. There is a description of the principle of operation of such a governor in Patent 2,032,743, dated March 3, 1936.

The governor-adjusting knob 56 has a groove into which fits a belt 58. This belt runs over a driving pulley 59, which is rotated at slow speed by a motor 60. The motion transmitting connections between the motor 60 and the pulley 59 include a reduction gearing unit 61 that effects a very substantial reduction in speed.

The motor 60 is reversible and can be operated to turn the knob 56 in either direction. A tachometer 63 mounted on the speed-reducing unit 53 is driven from that unit and is graduated to indicate the speed of movement of the carriage 10 along the track 12.

It is a feature of the invention that the governor adjustment motor is controlled from a remote station, which is shown in Fig. 1 as a switch box 64 that rests on the front bar 34. The switch box 64 is not attached to the front bar 34 but has flanges that extend below the bottom of the box to hold it against displacement transversely of the bar, but the box can be shifted lengthwise along the bar into any position most convenient for the attendant. The tachometer is located in such a position and the indications on the dial are of such size that readings of the tachometer can be made by the attendant operating the controls in the switch box 64 with the switch box in any position along the front bar 34.

Figure 3:
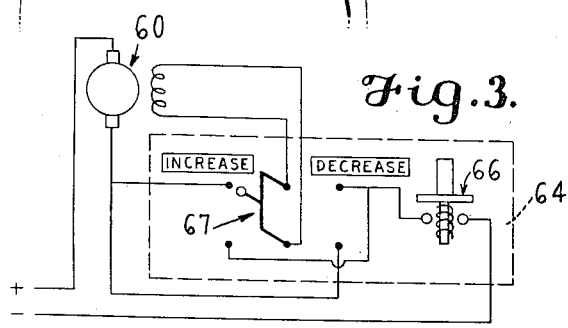
Fig. 3 is a wiring diagram of the control circuit for the motor that operates the governor adjustment shown in Figs. 1 and 2.

The switch box 64 includes a momentary contact switch 66 and a reversing switch 67. Legends on the switch box, best shown in Fig. 3, indicate which way the reversing switch must be thrown in order to cause the motor 60 to change the governor adjustment for faster or slower movement of the carriage 10. The wiring diagram for the governor adjusting motor and its controls is shown in Fig. 3. It is evident from this diagram that the switch 67 does not start or stop the motor but merely serves to control the direction in which the motor will turn when started.

The circuit to the motor 60 is completed only when the switch 66 is closed, and that switch being of the momentary contact type remains closed only as long as the attendant holds it depressed. When the speed shown on the tachometer is very near to the desired speed, the attendant usually inches the adjustment up to the desired position by touching the contacts of switch 66 together for only an instant at a time so that the adjusting motor 60 does not get a chance to come up to speed before being again shut off.

As shown in Fig. 1, the cutting machine is equipped to make straight-line cuts parallel to the track 12. The tracing device is not in use, there being no pattern table in position for the tracing device. The same effect could be obtained, however, by raising the tracing device so as to lift the traction wheel 46 off the table or pattern. The entire jointed supporting frame is held rigid so that there can be no movement of the front bar 34 relative to the carriage 10.

The jointed arms 19 and 38 and their connecting links 34 and 35 are locked into a rigid structure, that has no movement with respect to the carriage 10, by braces 68 and 69 on opposite sides of the carriage. Both of these braces are the same except for the necessary reversals to accommodate them to the right and left sides of the machine, and only one of these braces will be described.

The construction and connections of the brace 69 are shown in Fig. 5. At the upper end of the brace 69 there is a clamp 70 that securely grips the front bar 34, the faces of the clamp being shaped to fit the front bar. The clamp 70 has a fixed jaw 71 and a movable jaw 72 which swings about a pivot 73 to open the clamp to fit over the front bar. When the movable jaw 72 has been closed on the front bar, a yoke 75, hinged to the fixed jaw, is swung up over an extension 76 of the movable jaw 72, and a screw 77 in the end of the yoke 75 is screwed down against the extension 76 to clamp the jaws tightly against the front bar 34.

The clamp 70 is a detachable fastening means for connecting the brace 69 with the front bar 34. When this clamp is released and the movable jaw 72 swung back clear of the front bar 34, the brace 69 turns counter-clockwise about a pivot connection 79 by which the brace is attached to the carriage 10. The pivot connection is located some distance back of the front end of the carriage body, and the brace 69 passes through a guide 80, which is situated on the carriage some distance ahead of the pivot connection 79 and which prevents any transverse movement of the brace 69. Because of the length of the brace 69, the pivot connection 79 alone could not be relied upon to hold the front bar 34 against movement transverse of the brace 69. With the guide 80 constructed as shown in the drawings, however, the brace 69 is extremely rigid and holds the front bar 34 and through it the whole jointed supporting frame against any movement relative to the carriage body that could affect the course followed by the cutting torch or affect the speed of movement of the torch.

The construction of the guide 80 is shown in Fig. 6. This guide comprises a bracket or inner member 82 rigidly connected to the carriage body 10, and a cover plate 83 that contacts with end lugs 84, 85 of the inner member 82. and is held firmly against these lugs by screws 87. The lugs 84 and 85 serve as abutments to limit the up and down movement of the brace 69, and the confronting faces of these lugs are preferably in angular relation, as shown in Fig. 5, so as to have surface contact with the brace 69 when and if the brace comes against them.

The space between the cover plate 83 and the surface of the inner member 82 between the lugs 84, 85 comprises a guide slot in which the brace 69 fits freely at the lower end but tightly at the upper end. A pad 89 on the inner member 82 is machined to give the upper portion of the guide slot an accurate width into which the brace 69 fits without side play. The brace may even "bind" somewhat in the upper end of the slot because it is better to have the slot a little too narrow with considerable friction than slightly too wide with resulting side play.

The preferred embodiment of the invention has been described, but other embodiments can be made. Terms of orientation in the description and claims are, of course, relative, and some features of the invention may be used without others.

I claim:

1. Cutting or welding apparatus including a carriage body with wheels on which it is supported, a motor on the carriage body operatively connected with one or more of the wheels, a centrifugal governor connected in the motor circuit and driven by the motor, and a power-operated device connected with the governor for adjusting the governor to change the speed to which the governor holds the motor.

2. Torch cutting or welding apparatus including a wheeled carriage and a motor on the carriage for driving the carriage at a substantially uniform speed, a centrifugal governor driven by the motor and connected in the motor circuit to control the motor speed, means for adjusting the governor including a member movable one way to cause faster operation of the motor and the other way to cause slower operation of the motor, and a reversible electric motor connected with said member.

3. In a cutting or welding apparatus having a torch carriage with wheels, a motor on said torch carriage, and an adjustable centrifugal governor controlling the motor speed, the improvement of reversible power means connected with the governor adjustment, and control means remote from the motor for effecting operation of the governor adjustment by said reversible power means.

4. The combination with a torch carriage having wheels, a motor on the carriage operatively connected with one or more of said wheels, and a centrifugal governor with an adjustment member by which the governor can be set to hold the motor to the desired speed, of a reversible electric motor operatively connected with the adjustment member of the governor, and control means for the electric motor that adjusts the governor, said control means including a reversing switch and a second switch that opens and closes the circuit, both of said switches being located in proximity to each other and remote from the motor that they control.

5. Cutting or welding apparatus comprising a self-propelled carriage including a motor and a governor for controlling the motor speed, means for adjusting the governor including a member rotatable in one direction to adjust the governor for higher speed and in another direction to adjust the governor for lower speed, power means for turning said member, and friction driving connections between said power means and the rotatable adjustment member of the governor.

6. In cutting or welding apparatus having a torch carriage with wheels, a motor on said torch carriage, and an adjustable centrifugal governor controlling the motor speed, the improvement of reversible power means connected with the governor adjustment, control means remote from the motor for effecting operation of the governor adjustment by said reversible power means, and a tachometer for indicating the speed of movement of the carriage, the tachometer being located in a position where it is conveniently visible to an operator attending the remote control means.

7. In cutting or welding apparatus including a motor, a centrifugal governor adjustable to make it effective at different motor speeds, a remote control station, manually actuated means at said remote control station, and apparatus responsive to said manually actuated means for changing the adjustment of the governor.

8. The combination in universal cutting or welding apparatus of a supporting frame for a torch and a tracer, mechanism for moving the supporting frame including an electric motor, an adjustable centrifugal governor for controlling the motor speed, a control station located on the supporting frame near the tracer, and means operated from said control station to change the adjustment of the centrifugal governor.

9. In cutting or welding apparatus including a motor, a centrifugal governor adjustable to make it effective at different motor speeds, a torch and tracer supporting frame, a remote control station supported by the frame and movable to different locations on the frame, and apparatus between the remote control station and the governor by which adjustment of the governor can be changed from said remote control station.

10. A cutting or welding machine including in combination a movable base, a frame for supporting a torch and tracer for universal movement in a plane with respect to the base, a brace extending from the base to the frame and constructed and arranged to hold the frame locked against movement relative to the base so that a torch supported by the frame has the same movement as the base, and detachable fastening means connecting the brace with at least one of the parts of the machine between which said brace extends.

11. The combination with a cutting or welding machine having a movable carriage with spaced supports, parallel links extending from said supports, and a folding parallelogram frame connected with the forward end of said links and having a front bar for supporting a torch and tracer for movement in any and changing directions in a plane, of restraining means including one or more braces connected to the carriage, and detachable fastening means by which said one or more braces can be attached to a link of the folding parallelogram, said restraining means being of such a character that it holds the front bar locked against movement relative to the carriage.

12. A cutting or welding machine comprising a carriage body, means for supporting a torch and tracer for movement in any and changing directions in a plane, said means including a jointed frame having a front bar on which are mounted the torch and the tracer of the machine, a brace pivotally connected at one end to the carriage body below the level of the front bar and extending upward at an angle to the plane of movement of the torch and tracer, releasable clamping means rigidly connecting the front bar and said brace, and a guide at the side of the carriage body including a bracket with a cover plate, forming a slot through which the brace extends and in which the brace is such a snug fit that it is held against displacement in a lateral direction by the sides of the slot while said brace is held against other displacement by the fastenings which connect it with the carriage body and the front bar.

13. A cutting or welding machine comprising a carriage body, means for supporting a torch and tracer for movement in any and changing directions in a plane, said means including a jointed frame a part of which comprises a folding parallelogram one side of which is a bar that supports the torch and tracer, means for holding the jointed frame against movement with respect to the carriage body, said means including a brace fastened to the carriage body some distance back of the front of the carriage, a guide on the carriage ahead of the region where the brace is fastened to the carriage, said guide having a slot through which the brace passes and the slot being slightly wider than the brace toward the lower end of the slot and no greater in width than the brace toward the upper end of the slot, and a clamp at the forward end of the brace with jaws shaped to fit the front bar.

14. A cutting or welding machine including in combination a motor driven carriage, a centrifugal governor connected in the motor circuit and effective to hold the motor speed to a predetermined value, said governor including means by which it can be adjusted to change the motor speed, a jointed frame on the carriage, a torch-holder and tracer-holder supported by the frame with connections between said holders of such a nature that movement of the tracer in any and changing directions along a course causes the torch to follow a similar course whether the carriage is stationary or in motion, and releasable means operable to lock the jointed frame against movement relative to the carriage with the torch-holder in position to operate over a work-piece.

15. In a cutting or welding machine having a carriage that is intermittently moved to extend the field of operation of the machine, and a jointed frame on the carriage constructed and arranged to support a torch and tracing device for movement in any and changing directions in a plane along identical courses when the carriage is either stationary or in motion, the improvement of means operable to lock the jointed frame against movement so that the torch supported by the frame remains in a fixed relation to the carriage, a governor controlling the speed of movement of the carriage, and a control station, remote from the governor, from which said governor can be adjusted to change the speed at which the carriage travels.

16. A cutting or welding machine including in combination a motor-driven carriage, a centrifugal governor connected in the motor circuit and effective to hold the motor speed to a predetermined value, said governor including means by which it can be adjusted to change the motor speed, a jointed frame on the carriage, a torch-holder and tracer-holder supported by the frame with connections between said holders of such a nature that movement of the tracer in any and changing directions along a course causes the torch to follow a similar course whether the carriage is stationary or in motion, and one or more braces connected at one end with the carriage body and at the other end with some part of the jointed frame in such relation that the jointed frame is held against movement with respect to the carriage while said frame remains in an extended position and supports the torch-holder over the work area.

JAMES L. ANDERSON.